United States Patent [19]

Greenlee

[11] 4,431,691

[45] Feb. 14, 1984

[54] DIMENSIONALLY STABLE SEALANT AND SPACER STRIP AND COMPOSITE STRUCTURES COMPRISING THE SAME

[75] Inventor: Thomas W. Greenlee, Shaker Heights, Ohio

[73] Assignee: Tremco, Incorporated, Cleveland, Ohio

[21] Appl. No.: 287,975

[22] Filed: Jul. 29, 1981

Related U.S. Application Data

[63] Continuation of Ser. No. 507,232, Jan. 29, 1979, abandoned.

[51] Int. Cl.³ .......................... B32B 3/26; E06B 3/24

[52] U.S. Cl. .................................. 428/34; 52/171; 52/172; 156/107; 156/109; 428/76; 428/119

[58] Field of Search ................ 428/34, 119, 174, 162, 428/182, 295, 76, 122, 181; 156/107, 109; 52/171, 172, 716–718; 49/486–494

[56] References Cited

U.S. PATENT DOCUMENTS

| | | | |
|---|---|---|---|
| 2,838,810 | 6/1958 | Englehart et al. | 20/56.5 |
| 2,885,746 | 5/1959 | Gura | 20/56.5 |
| 3,280,523 | 10/1966 | Stroud et al. | 52/172 |
| 3,288,667 | 11/1966 | Martin . | |
| 3,758,996 | 9/1973 | Bowser | 52/172 |
| 4,074,480 | 2/1978 | Burton | 52/127 |

FOREIGN PATENT DOCUMENTS 1189518 4/1970 United Kingdom .

*Primary Examiner*—Paul J. Thibodeau
*Attorney, Agent, or Firm*—M. J. Colitz, Jr.

[57] ABSTRACT

A dimensionally stable sealant and spacer strip comprising an elongated ribbon of deformable sealant enveloping and having embedded therein spacer means extending longitudinally of the ribbon of sealant. The thickness of the enveloping sealant extends beyond the spacer means in an amount sufficient to maintain a continuous sealing interface under applied compressive forces but insufficient to permit substantial distortion of the strip under such applied compressive forces.

6 Claims, 4 Drawing Figures

DIMENSIONALLY STABLE SEALANT AND SPACER STRIP AND COMPOSITE STRUCTURES COMPRISING THE SAME

This is a continuation, of application Ser. No. 007,232, filed Jan. 29, 1979, now abandoned.

INTRODUCTION

This invention relates to an improvement in structural sealants. The invention has particular applicability to structural sealants used in the fabrication of thermal insulating, multiple glazed structures, and will be described with reference thereto. It will be appreciated, however, that the invention has other and broader applications limited only by the imagination of those skilled in the art to which the invention pertains.

BACKGROUND OF THE INVENTION

In general, the procedure for assembling a multiple glazed structure involves placing one sheet of glass over the other in a fixed, spaced relationship, and then injecting a sealant composition into the space between the two sheets of glass, at and along the periphery of the two sheets, thereby forming a sandwich structure having a sealed air pocket.

Heretofore the means employed for maintaining the spacing between the sheets of glass was either of a temporary, removable nature, or of a permanent nature. Exemplary of temporary removable spacer means are those disclosed in U.S. Pat. Nos. 2,275,812 and 3,097,061. U.S. Pat. Nos. 3,758,996 and 4,113,905 show embodiments of permanently installed spacer means. U.S. Pat. No. 3,758,996 also teaches the concept of incorporating a desiccant within the spacer means. The desiccant functions as a medium upon which moisture and organic materials in the sealed air pocket are sorbed. This prevents the moisture from condensing on and fogging the interior surfaces of the sheets of glass.

In practicing the teachings of the prior art, multiple steps are required. Where a removable spacer means is employed, the spacer means must be set in place, the sealant injected, the sealant cured, and the spacer means thereafter removed. Where a permanent spacer means is employed, an adhesive is applied to secure the permanent spacer to the glass sheets, the spacer is then set in place, and a sealant is then injected into the peripheral channel formed between the spacer and the edges of the sheets of glass.

These prior art practices are cumbersome, labor intensive and expensive, and are believed to have been instrumental in limiting the fabrication of energy saving, thermal insulating multiple glazing structures to factory assembly, and the installations thereof, to situations where cost effectiveness is established by very high energy costs.

Clearly, the prior art practices do not readily lend themselves to on-the-job assembly, as is, for example required in retrofitting single glazed structures to thermal insulating multiple glazed structures. U.S. Pat. No. 3,573,149 describes a rather complex prior art procedure for forming double glazed windows which can be used in retrofit applications. The procedure involves the use of a spacer member in which is embedded a resistance wire, and to which is appended a tubular member containing desiccant. The procedure involves cutting the thermo-electric spacer and sealing strip to the peripheral length of the panel with sufficient extra length to form electrical terminals for connection to a power supply source, unsheathing the ends of the resistance wire passing through the strip and applying an electric potential thereto to heat the strip until it becomes pliable, applying the strip to the perimeter of one panel, reapplying an electric potential to the resistance wire to soften the strip, aligning a second panel and pressing the panels together, again applying an electric potential to cure the strip, and trimming off the ends of the strip.

In addition to being a cumbersome and undoubtedly expensive procedure, it should be noted that the thermo-electric spacer and sealing strip employed in the patented arrangement does not provide any means for positively maintaining a predetermined space between the panels. Indeed, the patentees state that the glass panes are gently but firmly pressed together until the sealing strip "shows a black vitreous effect all around."

Other references, of general interest in showing the state of the art are U.S. Pat. Nos. 2,695,430 and 3,045,297, and British Pat. No. 605,234 all of which show use of various rigid spacer members and separators for multiple pane window units, luminous panels and the like.

Against this background of cumbersome, inefficient methodology, and multicomponents materials and structures for assembling multiple glazing structures, the present invention contributes to the art a unitary, multipurpose structure which functions as a sealant and spacer, and optionally a desiccant, the use of which in assembling multiple glazing structures simplifies the methodology, reduces costs and permits assembly to be conducted on-site as a retrofit acitivity, or in a factory, with equal facility. Moreover, the use of the single unitary structure of the present invention substantially reduces the labor and materials costs involves in assembling multiple glazing structures, thereby making such installations cost effective against lower energy costs than is the case with more expensive prior art materials and procedures.

SUMMARY OF THE INVENTION

It is therefore an object of the present invention to provide an improvement in the structural sealant art having substantial applicability to the assembly of multiple glazing structures as well as to other structures.

It is a further object of the invention to provide a unitary structure which functions as a sealant and spacer, and optionally as a desiccant, and which finds utility in the fabrication of multiple glazing structures, and other structural assemblies.

Yet another object of the invention is to provide a dimensionally stable sealant and spacer strip which includes means for positively controlling the spacing between two members which are in pressure contact with the strip.

In accordance with one aspect of the present invention there is provided a dimensionally stable sealant and spacer strip comprising an elongated ribbon of deformable sealant enveloping and having embedded therein spacer means extending longitudinally of the ribbon of sealant, the spacer means having surfaces and edges all of which are in intimate contact with the sealant, the spacer means being capable of resisting compressive forces exerted in at least one plane normal to a plane in which the longitudinal axis of the spacer means lies, the thickness of the enveloping sealant extending beyond the spacer means in at least said one plane, being sufficient to maintain a continuous sealing interface under applied compressive forces, but insufficient to permit substantial distortion of the sealant strip under applied compressive forces.

In accordance with another aspect of the invention there is provided a composite structure comprising first and second members having facing, generally parallel surfaces spaced a finite distance from each other, and means for maintaining the members in spaced relationship and for effecting a seal between the facing surfaces, said means comprising an elongated body of deformable sealant and spacer means enveloped by and embedded in the sealant and extending longitudinally of said elongated body thereof, said means being disposed within and bridging the space between the first and second members, the deformable sealant being in sealing engagement with the facing surfaces, the spacer means being in pressure contact with the facing surfaces and having sufficient strength in a direction normal to said surfaces to maintain the first and second members said finite distance from each other.

Other objects, features, aspects and advantages of the invention will become apparent to those skilled in the art from the following detailed description which, together with the accompanying drawings, discloses the best mode presently contemplated for practicing the invention.

DESCRIPTION OF THE PREFERRED EMBODIMENTS

Figure 1:
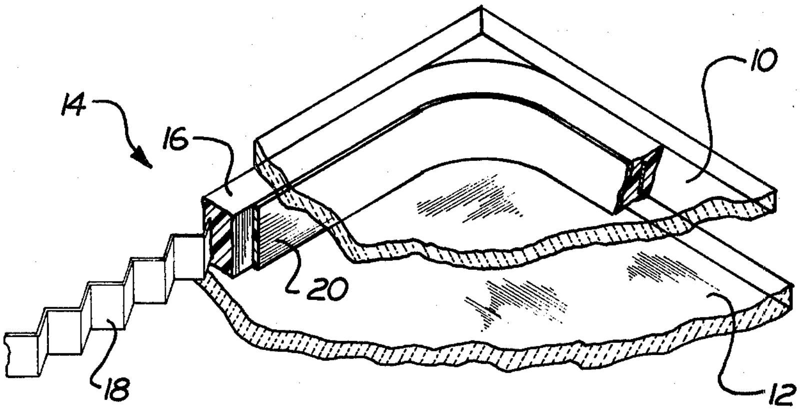
FIG. 1 is a fragmentary perspective view, with parts in section, showing a first embodiment of the present invention.

Referring now to the drawings, it will be seen that FIG. 1 illustrates a composite structure comprising first member 10 and second member 12 having facing, generally parallel surfaces, spaced a finite distance from each other, and means for maintaining members 10, 12 in such spaced relationship and for effecting a seal between the facing surfaces thereof, comprising a sealant and spacer strip of the present invention, designated generally as 14.

Members 10, 12 as illustrated are formed of glass. However, it will be appreciated that the invention has applicability in the environment of an unrestricted variety of construction or structural materials, including without limitation cement, concrete, brick, stone, metals, plastics and wood.

As further illustrated in FIG. 1 sealant and spacer strip 14 comprises elongated ribbon 16 of deformable sealant, enveloping and having embedded therein spacer means 18 extending longitudinally of ribbon 16.

In the embodiment illustrated, spacer means 18 takes the form of an undulating sheet of rigid material which may conveniently be formed of aluminum. It will be noted that all of the surfaces and edges of spacer means 18 are in intimate contact with ribbon 16.

Due to the geometry of spacer means 18 as illustrated in FIG. 1, it is capable of resisting compressive forces exerted on it in a plane which is normal to a plane in which the longitudinal axis of spacer means 18 lies, and which plane is coincident with a plane which is normal to the planes in which members 10, 12 lie. Thus, spacer means 18 is capable of resisting compressive forces tending to reduce the spacing between members 10, 12, and is thereby capable of maintaining members 10, 12 a predetermined finite distance from each other.

It will be apparent that if sealant and spacer strip 14 was rotated 90° about its own longitudinal axis, the orientation of spacer means 18 would be such that it would not be expected to be capable of resisting any substantial compressive forces exerted upon it in a direction normal to the surfaces of members 10, 12. The accordian folds would be expected to collapse. In view of this, it will be apparent that the particular embodiment of sealant and spacer strip illustrated in FIG. 1 requires attention to proper orientation for the strip to be effective as a spacer.

It has been found in practice that the orientation of spacer means 18, even though completely embedded within ribbon 16, is discernable upon visual inspection, since the enrobing sealant to a slight extent tends to follow the undulations of spacer means 18.

Nevertheless, to simplify the matter of orientation, and for another reason explained below, it is contemplated that the surface of sealant and spacer strip 14 which is intended to lie in a plane normal to the surfaces of members 10, 12, be provided with an identifying indicia. Thus, all a fabricator need do is observe that the surface of sealant and spacer strip 14 which bears the indicia, be positioned perpendicularly to a surface of members 10, 12. This will insure that the sealant and spacer strip is correctly oriented.

Where the invention is applied to the fabrication of multiple panel structures of transparent material, such as glass or plastic, the interior, vertical surface of sealant and spacer strip 14 is visible in the completed unit. In many commercial assemblies, this surface has a finished look since it corresponds to the bottom outside surface of a permanently installed metal spacer member. Where it is desired to provide as aesthetically pleasing corresponding surface on the sealant and spacer strip of the present invention, the previously described indicia may serve this dual function. Thus, the interior, vertical surface of sealant and spacer strip 14 may be provided with decorative facing 20 which may be adhesively or cohesively applied, or coextruded with sealant and spacer strip 14.

When facing 20 is positioned perpendicularly to the surfaces of members 10, 12 and interiorly of their peripheral edges, it functions both as a means for orienting spacer means 18, and as a means providing the exposed interior, vertical surface of sealant and spacer strip 14 with an aesthetically pleasing, decorative facing.

An additional advantage of the configuration of spacer means 18 illustrated in FIG. 1, is that it permits sealant and spacer strip 14 to be bent readily around corners. This capability is particularly desirable where the sealant and spacer strip is employed in the fabrication of multiple panel units which acts as a thermal insulating barrier, e.g., double glazed thermal insulating windows. In such units the air space between the two panel member is sealed from the atmosphere. The fewer joints which are employed in establishing the seal, the less is the risk of failure of the seal, which failure is most likely to take place at a joint. Since sealant and spacer strip 14 can be bent around corners, a peripheral seal can be effected with only one joint.

As previously noted elongated ribbon 16 of deformable sealant envelopes and completely embeds spacer means 18. The thickness to which elongated ribbon 16 extends beyond the surfaces and edges of spacer means 18 is not critical an an absolute measurement, but is important in terms of functional considerations. Thus, the thickness of the enveloping sealant extending beyond spacer means 18, at least in the plane subjected to compressive forces, must be sufficient to maintain a continuous sealing interface under the applied compressive forces, but insufficient to permit substantial distortion of the sealant and spacer strip under such applied compressive forces. There must be enough sealant to effect a seal, but not so much as to cause a disfiguring amount of "ballooning" of the sealant in the area bridging the surfaces of the two panel members.

For most applications, where the surfaces of the two members being sealed are relatively smooth, the thickness of the enveloping sealant extending beyond the spacer means should be on the order of ⅛". This has been found to be sufficient to provide a seal, without producing excessive ballooning.

Because the surfaces of tempered glass may not be as flat as the surfaces of untempered glass, somewhat greater thicknesses may be required to provide tempered glass with an adequate seal. Where the surfaces of the two members being sealed are rough, as for example, in the case of concrete, thicknesses as high as a ¼" or more may be needed to effect a seal.

As previously noted, spacer means 18 may be formed of aluminum. It may however be formed of alternative materials, including suitably treated paper, such as waterproofed kraft paper, plastic, and of course metals other than aluminum. Depending upon the material used and the configuration of the spacer means, a wide variety of fabrication methods may be employed, including extrusion, stamping, bending, and casting to name a few of the more common fabrication procedures.

The elongated ribbon of sealant has heretofore been described as "deformable", and this requires a word of explanation. The term "deformable" as used herein is intended to characterize a sealant, whether thermoplastic, thermosetting, or thermoplastic-thermosetting, which when used in the fabrication of composite structures contemplated by this invention, is at least initially incapable of resisting the compressive forces exerted upon it.

Thus, the term "deformable " is intended to characterize a material which in an uncured state is incapable of resisting compressive forces exerted upon it, even though upon curing it is capable of resisting such forces. Further, the term "deformable" is intended to characterize a sealant which is initially incapable of resisting the compressive forces exerted upon it, and remains so throughout its useful life.

It will become apparent from the foregoing explanation that the spacer means embedded in a deformable sealant in accordance with the present invention, may serve only the temporary function of maintaining the spacing between two members, until such time as the deformable sealant is cured to where the sealant itself is capable of resisting the compressive forces exerted upon the sealant and spacer strip. It will also be appreciated that the spacer means may function permanently as the sole means for maintaining proper spacing between two members, as in the case where the deformable sealant, being a true thermoplastic material, never becomes capable of resisting the compressive forces exerted upon it, at or above temperatures at which it flows.

It will therefore be understood that a wide variety of materials may be used as the deformable sealant, including polysulfide polymers, urethane polymers, acrylic polymers, and the styrene-butadiene polymers. Included among the latter are a class of thermoplastic resins which when below their flow temperature, exhibit elastic properties of vulcanized polymers. Such resins are sold by Shell Chemical Co. under the trademark Kraton.

Where the present invention is employed in the fabrication of multiple glazed, transparent thermal insulating units formed of glass or plastic, it may be desirable to use a desiccant for the reason described above. Conveniently, the desiccant can be incorporated within the deformable sealant matrix, within the spacer means or within the facing material. A particularly suitable class of materials for this purpose is synthetically produced crystalline zeolites sold by Union Carbide Corporation under the name Linde Molecular Sieves. Another desiccant which may be used is silica gel. Combinations of different desiccants are also contemplated.

The preferred method of manufacturing the sealant and spacer strip in accordance with the present invention is by coextrusion. This can be accomplished with commercially available coextruding equipment which in some instances may require minor modification. In general, a previously formed or just formed spacer means, is fed through the center of an extrusion die, and the deformable sealant is extruded around the spacer means. The composite material is then fed through a sizing die to obtain a sealant and spacer strip having the desired outside dimensions and the proper thickness of enveloping sealant extending beyond the spacer means. These coextrusion techniques are well known to those having ordinary skill in the art.

The provision of an orienting and/or decorative facing, if accomplished by coextrusion, may be achieved by the provision of a second coextrusion die which either precedes or follows the sizing die. In the latter event, a second sizing die may be employed beneficially. Alternatively, the orienting and/or decorative facing may be applied adhesively or cohesively as a separate laminating process after the coextrusion of sealant and spacer means has been sized. The settings on the sizing dies will of course have to take into consideration the fact that the addition of the orienting and/or decorative facing will increase the overall dimensions of the sealant and spacer strip.

Figure 2:
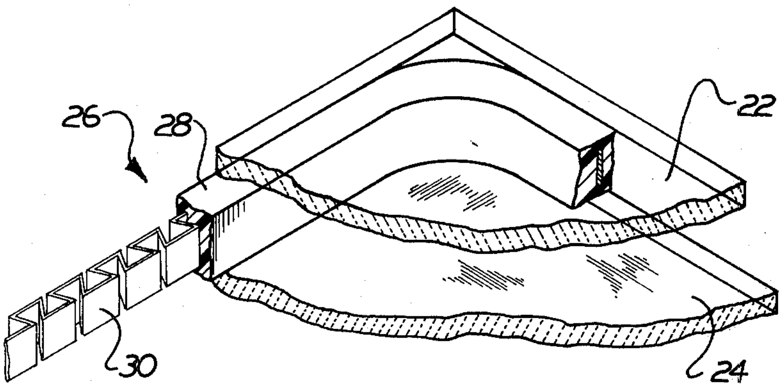
FIG. 2 is a fragmentary perspective view, with parts in section, showing a second embodiment of the present invention.

FIG. 2 shows a second embodiment of the invention wherein a composite structure comprises first and second members 22, 24 having facing, generally parallel surfaces spaced a finite distance from each other, and a sealant and spacer strip, designated generally as 26, maintaining members 22, 24 in spaced relationship and for effecting a seal between the facing surfaces thereof.

Sealant and spacer strip 26 comprises elongated body 28 of deformable sealant, and spacer means 30, enveloped by and embedded in the sealant and extending longitudinally of elongated body 28.

In the embodiment illustrated, spacer means 30 takes the form of a strip of material undulated to provide a continuous array of complementary triangular shapes. This configuration, when compared with the spacer means in FIG. 1, provides considerably more convoluted edge per unit length of spacer means. It will be readily apparent therefore that, the strength and thickness of the spacer means materials be equal, the embodiment of FIG. 2 will support higher compressive forces than will the embodiment in FIG. 1. However, as was the case with the FIG. 1 embodiment, the arrangement shown in FIG. 2 can be bent around corners, making this embodiment of sealant and spacer strip attractive for use where hermetic seals are needed.

Figure 3:
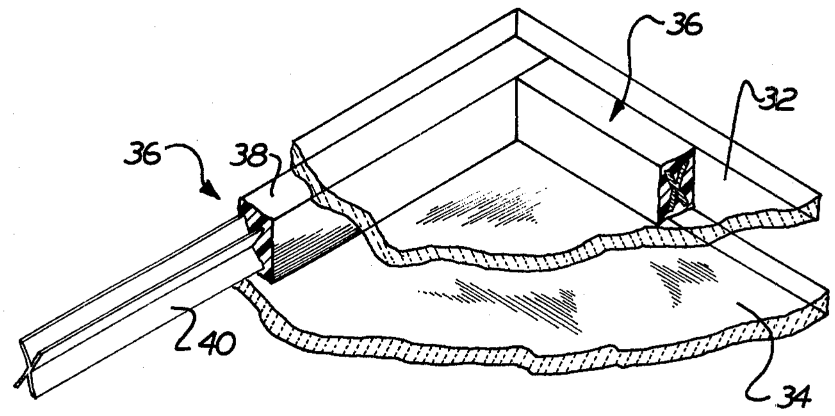
FIG. 3 is a fragmentary perspective view, with parts in section, showing a third embodiment of the present invention.

FIG. 3 illustrates a composite structure in accordance with the present invention comprising first and second members 32, 34 having facing, generally parallel surfaces spaced a finite distance from each other, and means for maintaining members 32, 34 in spaced relationship and for effecting a seal between the facing surfaces thereof in the form of a sealant and spacer strip, designated generally as 36. The sealant and spacer strip comprises elongated body 38 of deformable sealant, and spacer means 40 enveloped by and embedded in elongated body 38.

In the embodiment illustrated in FIG. 3, spacer means 40 has a generally X configuration, from which it will be apparent that it has the capability of resisting compressive forces without regard to the orientation of the spacer means about its longitudinal axis. Thus, this configuration obviates the need for the exercise of particular care in orienting the sealant and spacer strip, as well as the need for any orienting indicia. It may however be desirable to incorporate a decorative facing on one surface of the strip to satisfy aesthetic requirements.

The configuration illustrated in FIG. 3 does not lend itself to being bent around corners, and thus requires the use of butt joints, as illustrated in the drawing.

Figure 4:
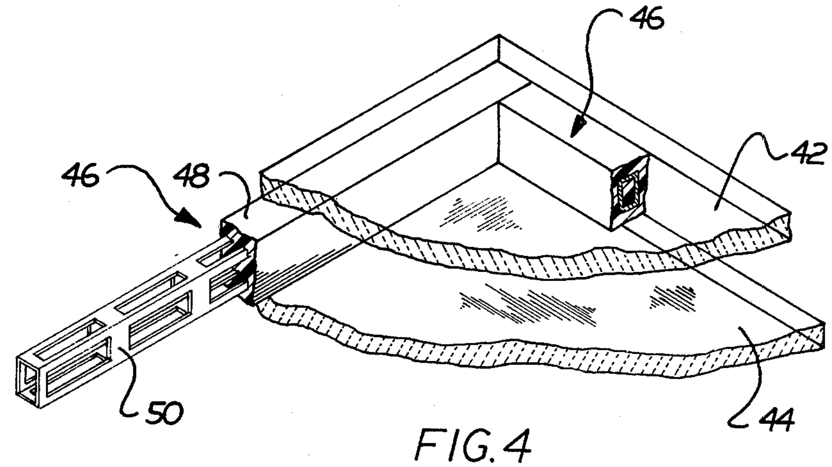
FIG. 4 is a fragmentary perspective view, with parts in section, showing a fourth embodiment of the present invention.

Turning to FIG. 4, there will be seen illustrated a composite structure comprising first and second members 42, 44 having facing, generally parallel surfaces spaced a finite distance from each other, and means for maintaining members 42, 44 in spaced relationship and for effecting a seal between the facing surfaces thereof, which means in the embodiment illustrated takes the form of a sealant and spacer strip designated generally as 46.

The sealant and spacer strip comprises an elongated body 48 of deformable sealant and spacer means 50 enveloped by and embedded in the sealant, and extending longitudinally of elongated body 48.

Spacer means 50 has an open box structure, which does not require special orientation as do the embodiments illustrated in FIGS. 1 and 2. Further, due to the comparatively massive structure of spacer means 50, it would be expected to be capable of supporting compressive loads far in excess of those supportable, for example, by the corresponding spacer means illustrated in FIG. 1.

As with the embodiment illustrated in FIG. 3, spacer means 50 does not lend itself to being bent around corners, and thus it can be employed most advantageously where butt joints are acceptable.

What is claimed is:

1. A composite structure comprising first and second glass members having facing, generally parallel surfaces spaced generally a finite distance from each other and unitary means located around, and in adhering contact with, the peripheries of said surfaces for maintaining said glass members in spaced relationship and for effecting a seal in the space between said glass members, said unitary means consisting of elongated, deformable, continuous sealant means and an essentially continuous rigid undulating spacer means embedded in said sealant means and extending longitudinally the entire length of said sealant means, said unitary means being disposed within and bridging the space between said first and second glass members with said sealant means being of a substantially common cross sectional configuration and having substantially flat, substantially parallel, opposed surfaces in adhesive engagement with said facing surfaces, said unitary means having sufficient strength in the plane normal to said facing surfaces to maintain said first and second members at a generally finite distance from each other with said spacer means out of contact with said first and second glass members and further including a desiccant within the matrix of the sealant means facing the space between said glass members.

2. A composite structure comprising first and second glass members having facing, generally parallel surfaces spaced generally a finite distance from each other and unitary means located around, and in adhering contact with, the peripheries of said surfaces for maintaining said glass members in spaced relationship and for effecting a seal in the space between said glass members, said unitary means consisting of elongated, deformable, continuous sealant means and an essentially continuous, rigid spacer means embedded in said sealant means and extending longitudinally the entire length of said sealant means with said sealant means covering the edges of said spacer means and the entire face of the spacer means which is facing the space between said glass members, said unitary means being disposed within and bridging the space between said first and second glass members with said sealant means being of a substantially common cross sectional configuration and having substantially flat, substantially parallel, opposed surfaces in adhesive engagement with said facing surfaces, said unitary means having sufficient strength in the plane normal to said facing surfaces to maintain said first and second members at a generally finite distance from each other with said spacer means out of contact with said first and second glass members and further including a desiccant within the matrix of the sealant means.

3. A composite structure comprising first and second glass members having facing, generally parallel surfaces spaced generally a finite distance from each other and unitary means located around, and in adhering contact with, the peripheries of said surfaces for maintaining said glass members in spaced relationship and for effecting a seal in the space between said glass members, said unitary means consisting of elongated, deformable, continuous sealant means and an essentially continuous, rigid, spacer means embedded in said sealant means and extending longitudinally the entire length of said sealant means with said sealant means facing the space between said glass members and also covering the edges of said spacer means, said unitary means being disposed within and bridging the space between said first and second glass members with said sealant means being of a substantially common cross sectional configuration and having substantially flat, substantially parallel, opposed surfaces in adhesive engagement with said facing surfaces, said unitary means having sufficient strength in the plane normal to said facing surfaces to maintain said first and second glass members at a generally finite distance from each other with said spacer means out of contact with said first and second glass members and further including a desiccant within the matrix of the sealant means.

4. A composite structure comprising first and second members having facing, generally parallel surfaces spaced a finite distance from each other, and unitary means for maintaining said members in spaced relationship and for effecting a seal in the space between said facing surfaces, said unitary means consisting of an elongated, deformable sealant and a rigid, continuous, undulating spacer means enveloped by and embedded in said sealant and extending longitudinally of said elongated body, said unitary means being disposed within and bridging the space between said first and second members with said deformable sealant in engagement with said facing surfaces, said spacer means being in pressure contact with said facing surfaces and having sufficient strength at least in one direction normal to said surfaces to maintain said first and second members said finite distance from each other due to the orientation of undulations of said spacer means and further including a desiccant within the matrix of said sealant facing the space between said first and second members.

5. A composite structure comprising first and second glass members having facing, generally parallel surfaces spaced generally a finite distance from each other, and unitary means located around, and in adhering contact with, the peripheries of said surfaces for maintaining said glass members in spaced relationship and for effecting a seal in the space between said glass members, said unitary means consisting of elongated, deformable, continuous sealant means and an essentially continuous, rigid spacer means embedded in said sealant means and extending longitudinally the entire length of said sealant means, said unitary means being disposed within and bridging the space between said first and second glass members with said sealant means being of a substantially common cross sectional configuration and having substantially flat, substantially parallel, opposed surfaces in adhesive engagement with said facing surfaces, said unitary means having sufficient strength in the plane normal to said facing surfaces to maintain said first and second members at a generally finite distance from each other with said spacer means out of contact with said first and second glass members and further including a desiccant carried by the sealant means facing the space between said glass members.

6. A composite structure comprising first and second glass members having facing, generally parallel surfaces spaced generally a finite distance from each other, and unitary means located around, and in adhering contact with, the peripheries of said surfaces for maintaining said glass members in spaced relationship and for effecting a seal in the space between said glass members, said unitary means consisting of elongated, deformable, continuous sealant means and an essentially continuous, rigid spacer means embedded in said sealant means and extending longitudinally the entire length of said sealant means covering the edges of said spacer means and extending to the face of said spacer means facing the space between said glass members, said unitary means being disposed within and bridging the space between said first and second glass members with said sealant means being of a substantially common cross sectional configuration and having substantially flat, substantially parallel, opposed surfaces in adhesive engagement with said facing surfaces, said unitary means having sufficient strength in the plane normal to said facing surfaces to maintain said first and second glass members at a generally finite distance from each other with said spacer means out of contact with said first and second glass members and further including a desiccant within the matrix of the sealant means facting the space between said glass members.

* * * * *